Oct. 25, 1949.  M. DAHNKE  2,486,126
MIXER
Filed April 9, 1945

Inventor:
Marye Dahnke,
By Evans, Pond & Anderson
Attorneys.

Patented Oct. 25, 1949

2,486,126

UNITED STATES PATENT OFFICE 2,486,126

MIXER

Marye Dahnke, Chicago, Ill., assignor to Kraft Foods Company, a corporation of Delaware Application April 9, 1945, Serial No. 587,339

1 Claim. (Cl. 259—113)

This invention relates to a mixer, particularly designed for the mixing of milk powder and other more or less similar products with water.

There have heretofore been available various mixers embodying a vertically elongated receptacle and a dasher or agitator movable vertically in the receptacle for mixing milk powder and other powder material with water and, in general, these mixers have been supplied with a dasher or agitator of such size that its periphery would at all times be closely adjacent the side wall of the receptacle, the common theory apparently being that of creating a high pressure or very rapid flow of liquid between the periphery of the agitator and the wall of the receptacle so as to cause the liquid to take up the powder.

It has been found that mixers of the conventional types do not operate satisfactorily for mixing certain powders with water such as, for example, dry milk powder, the characteristics of which appear to be somewhat different than other powders which have been satisfactorily mixed with the conventional mixers.

I do not know the reason why dry milk powder cannot be effectively mixed with water in a conventional mixer of the character indicated, but experience has adequately demonstrated the fact.

The object of the present invention is, therefore, that of providing a mixer whereby dry milk powder, and perhaps other powders of similar character, may be thoroughly and efficiently mixed with water.

Another object of the invention is to provide a mixer for the purpose indicated, which will be very simple in construction and which may be produced at very low cost, while being also easy to clean.

Other objects and advantages of the invention will be understood by reference to the following specification and accompanying drawing wherein there is illustrated a mixer embodying a selected form of the invention.

Figure 1:
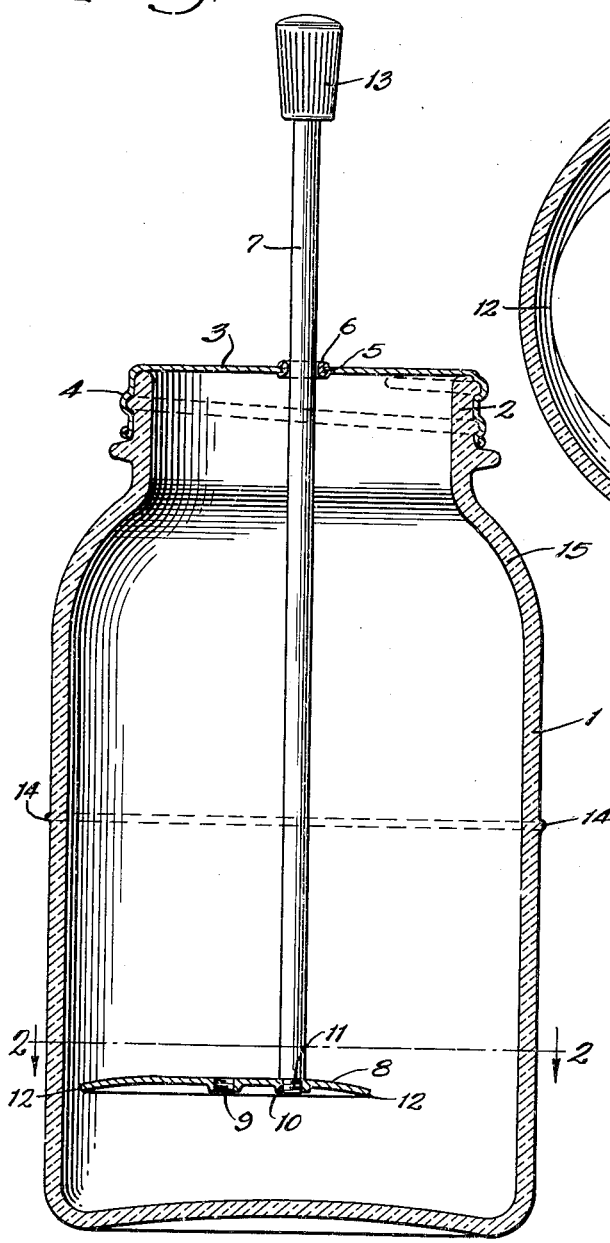
Fig. 1 is a vertical section through the axis of the mixer.
Figure 2:
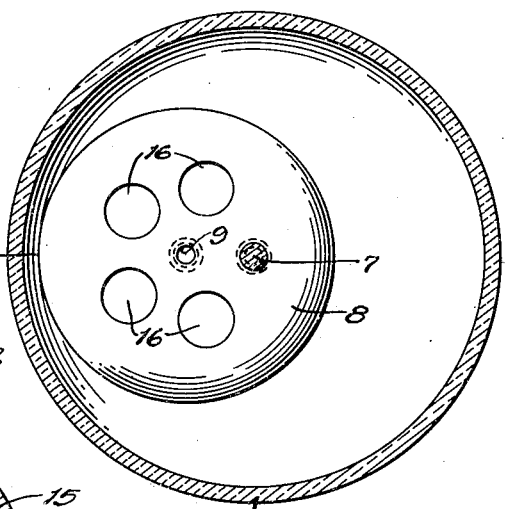
Fig. 2 is a plan section on the line 2—2 of Fig. 1.

The improved mixer comprises a receptacle 1, preferably made of glass or other material which is easy to wash and keep clean. The receptacle 1 is provided with an externally screw threaded mouth portion 2. A cap 3 of stainless steel or other non-corrosive, easily cleanable metal is provided, the cap being equipped with an internally threaded skirt or flange 4, which fits over the outside of the screw threaded mouth 2 of the receptacle so as to be capable of attachment and detachment to and from the receptacle.

The cap 3 may, of course, be made of material other than metal if desired, but stainless steel is preferable. It is equipped with a centrally disposed opening 5 and an eyelet 6, also preferably of stainless steel, which are secured in the opening 5 to form a smooth bearing for a vertically reciprocable agitator or dasher shaft or post 7.

The shaft or post 7 is a fairly close but, nevertheless, freely slidable fit in the eyelet 6, and it has detachably secured to its lower end a dasher or agitator disc 8. The disc 8 is illustrated as being equipped with an axially disposed screw threaded opening 9, and with an eccentrically disposed screw threaded opening 10, each of which is adapted to receive the screw threaded reduced end portion 11 of the shaft 7. The disc 8 is of such outside diameter that it will easily pass through the mouth portion 2 of the receptacle so that the agitator may be quickly and easily inserted and withdrawn from the receptacle for cleaning purposes when required.

By mounting the disc 8 eccentrically on the post 7 as shown, the edge portion 12 thereof may be brought into proximity to the side wall of the receptacle so as to be capable of disturbing any settlement of material in the bottom of the receptacle adjacent the sides thereof. By rotating the shaft 7, the edge portion 12 of the disc may, of course, be brought into proximity to any selected portion of the side wall of the receptacle.

The upper end of the shaft 7 is provided with a suitable knob which may be of metal, plastic or other suitable material, the knob being suitably anchored on the upper end of the shaft. The provision of a small round knob of the character indicated, facilitates rotation of the agitator, while also effecting vertical reciprocation thereof.

The receptacle 1 may have a capacity of about one quart, but it is preferable that for mixing dry milk powder and the like with water, not more than one pint of liquid be mixed at one time. To indicate the desired limit of liquid, a bead 14 may be formed on the wall of the receptacle 1 to indicate the height to which liquid should be filled in the container for best results.

The desired amount of dry milk powder and water having been placed in the receptacle, the agitator is inserted and the cap 3 attached by means of the screw threading. Then the agitator is worked up and down and, if the disc 8 is eccentrically mounted on the shaft as shown, the agitator is also gradually rotated. It is not, however, essential that the disc 8 be eccentrically mounted on the shaft since experience has shown that effective results are obtained when the disc is coaxially mounted on the shaft. In either arrangment, the periphery of the disc is spaced substantially from the wall of the container so that free turbulent motion of the liquid is permitted around the agitator disc as an incident to its movement up and down in the liquid. This turbulent liquid action effectively causes the powder to be taken up from the bottom of the receptacle, and effectively mixed with the liquid.

In the arrangement shown, the area of the disc 8 is approximately three-fifths of the cross sectional area of the interior of the receptacle. Hence, the area of the free passageway for liquid and powder around the periphery of the agitator disc is in the neighborhood of two-fifths of the total inside cross sectional area of the receptacle. This relationship is not by any means critical but it is representative of the substantial area which has been found to be conducive to effective mixing of dry milk powder with water.

When mixing is being effected some liquid will inadvertently be splashed upwardly. It has been found that in the arrangement shown there is an advantageous tendency for any such upwardly splashed liquid to engage the inwardly curved upper wall portion 15 of the receptacle which deflects and returns the splashed liquid to the lower portion of the receptacle. It will be apparent that such upward splashing would normally be effected around the outside edges of the disc 8 which apparently explains the said tendency for the splashed liquid to engage the inwardly curved portion 15. Normally the shaft 7 need not be pulled upwardly to such an extent as to withdraw any portion of the shaft which is normally immersed in the liquid in the receptacle since the latter is filled to somewhat less than one-half of the total depth of the receptacle. Hence, the only liquid carried by the shaft 7 upwardly through the eyelet 6 would be any small quantities thereof which are splashed against the shaft upon being deflected from the curved wall portion 15. It may also be observed that it is not necessary to reciprocate the agitator to such an extent that the disc is completely withdrawn from the liquid on each of the upward movements of the agitator which further avoids the carrying of liquid upwardly through the eyelet 6 by the shaft 7.

To avoid the trapping of milk powder or the like below the agitator disc 8, and to add to the liquid turbulence effected by the agitator, the disc 8 may be equipped with a series of holes, such as indicated at 16. The said holes are not, however, of importance to the satisfactory operation of the mixer.

The shaft 7 and the dasher 8 may also be made of stainless steel (or any other suitable material) which is easily cleanable so as to maintain sanitary conditions.

While the described mixer is particularly adapted to the mixing of dry milk powder, and perhaps other powders of similar character which cannot be effectively mixed with water by conventional mixers, it is nevertheless also entirely effective and efficient for mixing malted milk and other powders with milk, water, or other liquids.

Changes in the described structure may be made while retaining the principles of the same.

I claim:

A mixer of the class described, comprising a receptacle having a constricted circular mouth portion and an enlarged body portion constituting a mixing chamber, an agitator embodying a shaft having a screw threaded lower end, and a rigid circular disc provided with a pair of tapped openings for selectively receiving the screw threaded end of said shaft to rigidly secure the disc to the shaft, one of said tapped openings being disposed substantially axially of the disc and the other eccentrically thereof so as to position the disc eccentrically of said mixing chamber but in spaced relation to the wall thereof at its nearest point, said disc being of a diameter only slightly less than that of said mouth so as to be insertable into and removable from said mixing chamber through said constricted mouth, the cross sectional area of said mixing chamber being substantially greater than the area of said disc so as to permit free turbulent liquid movement between the disc and wall of the receptacle upon reciprocation of the agitator in the receptacle, and cap means seatable on said receptacle mouth and provided with an opening slidably receiving said agitator shaft.

MARYE DAHNKE.

REFERENCES CITED

The following references are of record in the file of this patent:

UNITED STATES PATENTS

| Number | Name | Date |
|---|---|---|
| 813,732 | McCardle et al. | Feb. 27, 1906 |
| 1,023,075 | Gilda | Apr. 9, 1912 |
| 1,371,117 | Roberts | Mar. 8, 1921 |
| 1,532,185 | Kirby | Apr. 7, 1925 |
| 1,762,421 | Pyle | June 10, 1930 |
| 2,047,182 | Gannon | July 14, 1936 |

FOREIGN PATENTS

| Number | Country | Date |
|---|---|---|
| 75,152 | Switzerland | June 1, 1917 |